Figure 1:
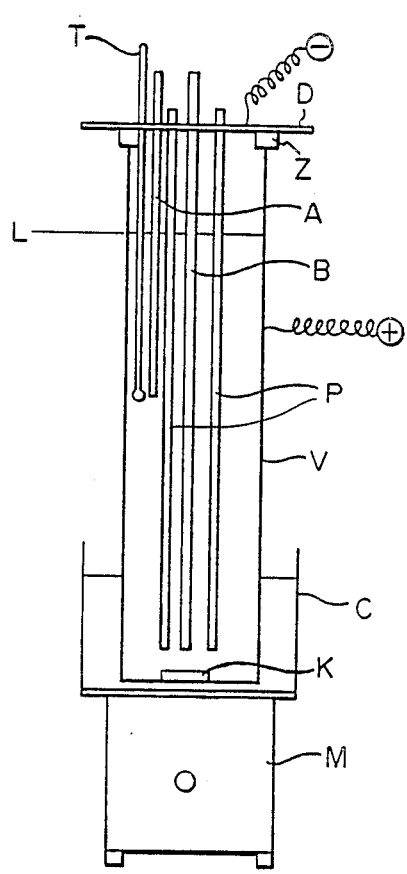

United States Patent [19]

Kitabatake

[11] Patent Number: 4,977,203

[45] Date of Patent: Dec. 11, 1990

[54] COATING RESIN COMPOSITION

[75] Inventor: Michiharu Kitabatake, Hiratsuka, Japan

[73] Assignee: Kansai Paint Co., Ltd., Hyogo, Japan

[21] Appl. No.: 222,828

[22] Filed: Jul. 22, 1988

[30] Foreign Application Priority Data

Jul. 25, 1987 [JP] Japan .................................. 62-185666

[51] Int. Cl.$^5$ ..................... C08G 59/14; C09D 5/44; C08L 63/00
[52] U.S. Cl. ..................................... 523/420; 523/417; 525/504; 528/111; 528/341; 528/361; 528/365
[58] Field of Search ............... 528/111, 341, 361, 365; 525/504; 523/417, 420

[56] References Cited

U.S. PATENT DOCUMENTS

| | | | |
|---|---|---|---|
| 3,305,493 | 2/1967 | Emmons | 523/420 |
| 4,383,103 | 5/1983 | Kluger | 528/111 |
| 4,542,202 | 9/1985 | Takeuchi et al. | 528/111 X |
| 4,596,844 | 6/1986 | Ohsawa et al. | 528/111 X |
| 4,721,742 | 1/1988 | Bertram et al. | 528/111 X |

Primary Examiner—Earl Nielsen

Attorney, Agent, or Firm—Wenderoth, Lind & Ponack

[57] ABSTRACT

A coating resin composition comprising, as a coating-forming resin binder, an epoxy resin derivative containing a functional group represented by the following formula

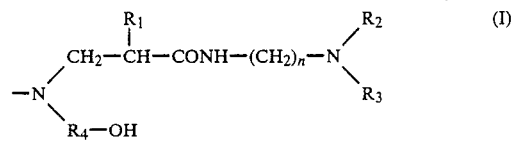

wherein
$R_1$ represents a hydrogen atom or methyl group; each of $R_2$ and $R_3$ represents a $C_1$–$C_5$ alkyl group independently of the other;
$R_4$ represents a $C_2$–$C_6$ alkylene group in which an ether group (—O—) may be present in the carbon chain; and
n represents an integer from 1 to 6.

This coating resin composition is useful for cathodic electrodeposition coating.

18 Claims, 1 Drawing Sheet

COATING RESIN COMPOSITION

This invention relates to a novel coating resin composition. More specifically, it relates to a coating resin composition having improved water-dispersibility and throwing power property, which is suitable especially for cathodic electrodeposition coating.

Resin binders hitherto used in many cathodic electrodeposition coating resin compositions are, in general, polyamine resins such as amine-added epoxy resin. For example, adducts of polyepoxide with secondary amine such as diethanolamine, ethylethanolamine and the like are often used. These resins are crosslinked and cured with a polyisocyanate compound blocked with alcohols, to form electrodeposition coatings, and they are highly evaluated in respect of the anticorrosion property of coatings. However, the above polyamine resins using a tertiary amino group as a cationic group have poor water-dispersibility in a stage of partial neutralization by a small amount of a neutralizing agent, and consequently, have a defect that they cannot give a cathodic electrodeposition coating resin composition having high pH values and high throwing power property.

As means to overcome the above problem, there are methods of using polyamine resins of which the water-dispersibility is improved by introduction of a ketimine-formed primary amino group into the polyamine resin. For example, such methods use an adduct of polyepoxide with secondary mono- and polyamines having ketimine-formed primary amino group (see, e.g., U.S. Pat. No. 4,017,438) or a reaction product obtained by etherification of polyepoxide and a hydroxy compound having ketimine-formed primary amino group (see, e.g., Japanese Laid-Open Patent Publication No. 43013/1984), and these methods are put to practical use.

In the case when ketimine-formed primary amino groups are neutralized with acid to form cations, the water-dispersibility of the resultant polyamine resin is good. However, when the resultant polyamine resin is used in combination with a curing agent having a low temperature-curing blocked isocyanate functional group or functional group having active double bonds (e.g., isocyanate blocked with hydroxyethylacrylate), there is a problem that the resultant coating resin composition has poor stability due to the presence of active hydrogen-containing cationic groups in the polyamine resin, and therefore, cannot be put to practical use.

For the above reason, the present inventors, keeping in view a demand for lower temperature curing and higher anticorrosion properties, made diligent studies in order to provide a coating resin composition exhibiting excellent performance in stability and water-dispersibility even in use in combination with a curing agent having low temperature curing property. As a result, it was found that a coating resin composition capable of achieving the above object can be obtained by using, as a coating-forming resin binder component, an epoxy resin derivative obtained by reacting the epoxy group of an epoxy resin with a Michael addition reaction product of monoalkanolamine and dialkylaminoalkyl(meth)acrylamide. This finding led to completion of this invention.

According to this invention, therefore, there is provided a coating resin composition comprising, as a coating-forming resin binder, an epoxy resin derivative containing a functional group represented by the following formula

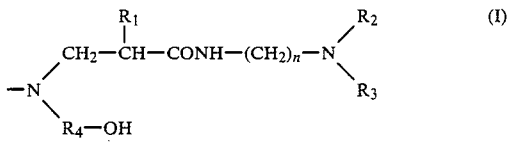

wherein
$R_1$ represents a hydrogen atom or methyl group; each of $R_2$ and $R_3$ represents a $C_1$–$C_5$ alkyl group independently of the other;
$R_4$ represents a $C_2$–$C_6$ alkylene group in which an ether group (—O—) may be present in the carbon chain; and
n represents an integer from 1 to 6.

The epoxy resin derivative for use as a coating-forming resin binder in the coating resin composition of this invention is one obtained by introduction of the functional group of the above formula (I) into an epoxy resin which is a substrate resin. The introduction of the functional group (I) can be carried out, for example, by reacting the secondary amino group of a Michael addition reaction product of monoalkanolamine and dialkylaminoalkyl(meth)acrylamide with the 1,2-epoxy group of an epoxy resin.

The Michael addition reaction product (iii) of monoalkanolamine and dialkylaminoalkyl(meth)acrylamide for use in production of the above epoxy resin derivative can be obtained, for example, by a reaction between a monoalkanolamine (i) and a dialkylaminoalkyl(meth)acrylamide (ii) as shown in the following scheme.

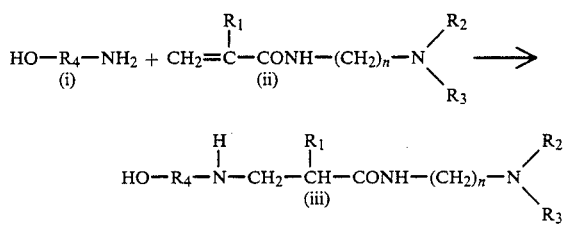

wherein $R_1$, $R_2$, $R_3$, $R_4$ and n are as defined above.

Examples of the monoalkanolamine (i) for use in the above reaction include 2-aminoethanol, 1-amino-2-propanol, 2-amino-1-propanol, 3-amino-1-propanol, 2-amino-1-butanol, 2-amino-2-methyl-1-propanol, 5-amino-1-pentanol, 4-methyl-4-amino-1-pentanol, 2-hydroxy-2'-(aminoethoxy)ethylether, 2-hydroxy-2'-(aminopropoxy)ethylether, etc. Above all, 2-aminoethanol and 3-amino-1-propanol are preferably used.

Examples of the dialkylaminoalkyl(meth)acrylamide (ii) include N,N-dimethylaminoethyl(meth)acrylamide, N,N-diethylaminoethyl(meth)acrylamide, N,N-dimethylaminopropyl(meth)acrylamide, N,N-diethylaminopropyl(meth)acrylamide, N,N-dimethylaminobutyl(meth)acrylamide, etc., and above all, N,N-dimethylaminopropylacrylamide is preferably used.

Michael addition reaction of monoalkanol amine (i) and dialkylaminoalkyl(meth)arylamide (ii) can be carried out by a method known per se. For example, said reaction can be carried out by using stoichiometrically equimolar amounts of (i) and (ii) and reacting these two components at a temperature of 20° to 90° C. for 2 to 10 hours.

A reaction of the resultant Michael addition reaction product (iii) of (i) and (ii) with the 1,2-epoxy group of an epoxy resin can give the coating-forming resin binder in this invention, i.e., an epoxy derivative having the functional group of the foregoing formula (I). The typical reaction here is as follows.

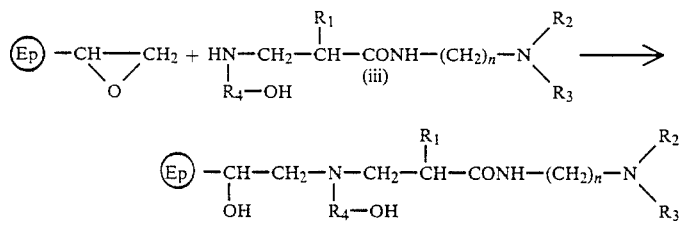

wherein Ep represents a skeleton portion of epoxy resin; however, it shall be noted that the above formulae show only one epoxy group for simplification, and that at least one other epoxy group is attached to Ep; and $R_1$, $R_2$, $R_3$, $R_4$ and n are as defined above.

Suitable as the epoxy resin for use in the above reaction are polyepoxide compounds having about two (average value) 1,2-epoxy groups

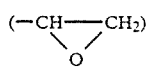

in one molecule and a number average molecular weight of not less than 200, preferably 400 to 4,000, or more preferably 800 to 2,000. Polypeptide compounds known per se can be used as such, and polyglycidyl ether of polyphenol, which can be prepared, for example, by reacting polyphenol with epichlorohydrin in the presence of alkali, is included in examples of such polyepoxide compounds. Typical examples of such polyepoxide compounds include glycidyl ethers of polyphenols such as bis(4-hydroxyphenyl)-2,2-propane, bis(4-hydroxyphenyl)-1,1-ethane, bis(4-hydroxyphenyl)methane, 4,4'-dihydroxydiphenyl ether, 4,4'-dihydroxydiphenylsulfone, phenol novolak, cresol novolak, etc., and polymerization products of these.

Among the above polyepoxide compounds, especially preferable in view of price and anticorrosion are polyglycidyl ethers of polyphenols having a number average molecular weight of at least about 380, preferably about 800 to 2,000 and an epoxy equivalent weight in the range of from 190 to 2,000, preferably from 400 to 1,000. Particularly, preferable is a polyepoxide compound represented by the following general formula.

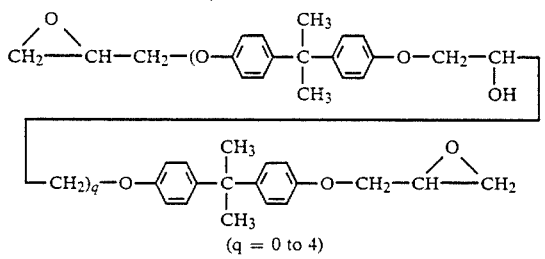

(q = 0 to 4)

Further, in the case where performances other than anticorrosion property are weighed, it is also possible to use polyglycidyl ethers of cyclic compounds such as bis(4-hydroxycyclohexyl)-2,2-propane, bis(4-hydroxycyclohexyl)methane, etc., polyglycidyl estes of terephthalic acid, tetrahydrophthalic acid, etc., epoxidized 1,2-polybutadiene, glycidyl(meth)acrylate copolymer, etc., in addition to the above-mentioned polyepoxide compounds.

The reaction between an epoxy resin and Michael addition reaction product (iii) proceeds by merely heating, in general, up to 80° to 140° C., preferably 100° to 120° C., and an alcohol-type, ketone-type or ether-type solvent may be used as required. The proportions of the 1,2-epoxy group of epoxy resin and Michael addition reaction product (iii) in use are not critical, and may be selected freely. Preferably, however, said proportions in molar ratio are usually in the range of from 2/1 to 1/1, particularly in the range of from 1.5/1 to 1.2/1, in order to avoid the presence of remaining unreacted Michael addition reaction product (iii) and gelation by remaining epoxy groups. In the case when said ratio exceeds the above range, it is desirable to allow a part of the 1,2-epoxy groups to react with the other reaction agent in advance.

The amount of Michael addition reaction product (iii) to be preferably introduced is in the range of, in general, from 0.05 to 2.0 moles, particularly from 0.05 to 1.0 mole, per 1,000 g of resin solid content. In the case where said amount is smaller than 0.05 mole, the water-dispersibility is low, and where said amount is larger than 2.0 moles, too large an amount of acid is required for solubilization into water.

The resultant epoxy resin derivative may be optionally imparted with other functions by reacting the remaining 1,2-epoxy groups with some other reaction agent. That is:

(a) The resultant epoxy resin derivative may be reacted with some other amine-type reaction agent having active hydrogen, to adjust the basicity and hydrophilic nature of said resin derivative. Examples of the amine-type reaction agent for that use include diethanolamine, ethylethanolamine, monoethanolamine methylisobutylketone ketimine, diethanolamine formaldehyde oxazolidine, hydrazine, hydroxyethylhydrazine, etc.

(b) Said resin derivative may be reacted with monocarboxylic acid, monophenol or monoalcohol to decrease the viscosity thereof and improve the smoothness of coatings. Examples of the reaction agents therefor include 2-ethylhexanoic acid, linoleic acid, nonyl phenol, 2-ethylhexanol, etc.

(c) Said resin derivative may be modified by reacting it with terminal hydroxyl or carboxyl or amino group-attached polyester, polyether, polyurethane, polyamide, polybutadiene, etc., to improve the properties of coatings. Examples of the modifiers usable for that purpose include polycaprolactonediol, polypropylene glycol, polytetramethylene glycol, dimer acid polyamide, terminal carboxyl-attached acrylonitrile butadiene copolymer, etc.

It is preferable that the reaction between the above reaction agent or modifier and the epoxy resin derivative in the above (a), (b) and (c) be carried out in advance of the reaction between the epoxy groups and Michael addition reaction product (iii). However, the former reaction may be carried out, as necessary, simultaneously with or after the latter reaction.

No special limitation is imposed on the amount of the above reaction agent or modifier in use for the modification of the epoxy resin if the properties of the epoxy resin per se are not impaired. However, the proportion of said reaction agent or modifier to the epoxy resin should be not more than ½ by weight, preferably not more than ¼.

In order to impart the thermosetting nature to said epoxy resin derivative, a crosslinking functional group may be introduced into said epoxy resin derivative, or an external curing agent may be used in combination. Examples of the crosslinking functional group that may be introduced include a known blocked isocyanate group, beta-hydroxyester group, alpha,beta-unsaturated carbonyl group, N-methylol group, etc. From the viewpoint of the low temperature curing property, it is preferable to introduce into the 1,2-epoxy group an active carbamic acid ester group represented by the following formula (e.g., see U.S. Pat. No. 4,528,363).

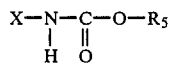

wherein
X represents a tertiary nitrogen atom, oxygen atom or sulfur atom, or an aliphatic $C_1$-$C_6$ hydrocarbon group having one of these atoms on its terminal; and
$R_5$ represents a $C_1$-$C_{12}$ hydrocarbon group which may contain a hydroxyl group or ether bond.

Examples of said active carbamic acid ester group include the following (a) to (d).

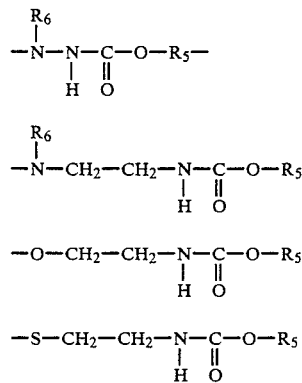

wherein
$R_5$ is as defined above; and
$R_6$ represents a methyl group, ethyl group, hydroxyethyl group, aminoethyl group or ethyl alkylcarbamate group.

Compounds usable as the external crosslinking agent are those having at least two crosslinking groups mentioned above in one molecule, e.g., blocked polyisocyanate, beta-hydroxyethylester of polycarboxylic acid, malonic acid ester derivative, methylol-substituted melamine, methylol-substituted urea, etc.

In order to render said epoxy resin derivative water-dispersible, it is sufficient to convert the tertiary amino group in the functional group (I) into a proton by water-soluble carboxylic acid such as formic acid, acetic acid, lactic acid, etc. The amount of acid (neutralization number) to be used for the conversion to proton cannot be strictly defined. In general, however, the preferable amount is in the range of from about 5 to about 40 KOH mg number, and especially it is in the range of from about 10 to 20 KOH mg number per 1g of resin solid content.

The resultant aqueous dispersion is suitable especially for cathodic electrodeposition coating, and in such an application, a pigment, solvent, curing catalyst, surfactant, etc., may be used in combination with the aqueous dispersion as required.

In carrying out the electrodeposition coating by using the above aqueous dispersion, it is possible to use a known method and process per se in use for the conventional cathodic electrodeposition coating. And in this electrodeposition coating, preferably, a substance to be coated is used as a cathode, and a stainless or carbon steel is used as an anode. The usable coating conditions are not especially limited. In general, however, the electrodeposition coating is preferably carried out with stirring under the conditions where a bath temperature = 20° to 30° C., an electric voltage = 100 to 400 V (preferably, 200 to 300 V), a current density = 0.01 to 3 A/dm$^2$), current application time = 1 to 5 minutes, electrode area ratio (A/C) = 2/1 to 1/2, and interelectrode distance = 10 to 100 cm.

The coating deposited on a substance to be coated can be cured by washing it and then baking it at a temperature of about 140° C. to 180° C.

The coating resin composition obtained according to this invention makes it possible to obtain high throwing power property owing to excellent water-dispersibility in low neutralization obtained by using the epoxy resin derivative having the functional group of the foregoing formula (I) as a coating-forming resin binder, even if the cationic group in the functional group (I) which imparts water-dispersibility is a tertiary amino group. Further, even if a curing agent having a low temperature curing type blocked isocyanate group or double bond is used in combination, it is possible to obtain a coating resin composition suitable for cathodic electrodeposition coating without impairing stability, due to the absence of an active hydrogen-containing cationic group in the functional group (I).

The following Examples will illustrate this invention more specifically.

In the Examples, "part" and "%" stand for "part by weight" and "% by weight", respectively.

EXAMPLE 1

Monoethanolamine (61 parts) was charged into a reaction vessel having a thermometer, stirrer, reflux condenser, dropping funnel and nitrogen gas-blowing port while a nitrogen gas was blown into the vessel, and the temperature of the vessel was elevated up to 60° C. Then, 156 parts of N,N-dimethylaminopropylacrylamide was added dropwise through the dropping funnel, and the reaction was carried out at 60° C. for 5 hours to give an adduct of N,N-dimethylaminopropylacrylamide with monoethanolamine.

Separately, 950 parts of bisphenol A diglycidyl ether having an epoxy equivalent weight of about 190, 340 parts of polypropylene glycol diglycidyl ether having an epoxy equivalent weight of about 340, 456 parts of bisphenol A and 21 parts of diethanolamine were charged to a similar reaction vessel. The temperature of the vessel was elevated to 120° C. to react the charged materials at 120° C. until the epoxy value was 1.02 m moles/g. Then, the reaction product was diluted with 479 parts of ethylene glycol monobutyl ether and cooled. While the temperature was maintained at 100° C., 158 parts of diethanolamine and 43 parts of the above adduct of N,N-dimethylaminopropylacrylamide with monoethanolamine were added to carry out the reaction until the viscosity increase stopped, and an epoxy resin derivative of this invention was obtained.

The above product (90 parts, resin solid content: 80%), 30 parts of ethylene glycol mono 2-ethylhexyl ether blocked 4,4'-diphenylmethanediisocyanate and 1 part of polypropylene glycol (PP-4000) were mixed, and then 1.49 parts of acetic acid (neutralization number: 14) was added. The mixture was warmed to 60° C., and deionized water was gradually added with stirring to disperse the mixture in the water. As a result, an emulsion having a resin solid content of 30%, average particle diameter of $0.1\mu$, pH 6.4, specific conductivity of 1,800 and good stability was obtained.

Three parts of basic lead silicate, 13 parts of titanium white, 0.3 part of carbon black, 3 parts of clay, 2 parts of dibutyl tin oxide and 1 part of nonionic surfactant Noigen 142B (manufactured by Dai-ichi Kogyo Seiyaku Co., Ltd.) were added to the above emulsion, and the pigments were dispersed in a ball mill until their particle diameters were not more than $10\mu$. The resultant dispersion was diluted with deionized water to a resin solid content of 15%, and electrodeposited on a zinc phosphate-treated steel plate (Bt#3080) at a bath temperature of 28° C. at 250 V for 3 minutes. Then, the electrodeposited coating was baked at 160° C. for 20 minutes to give a smooth-surface coating having a thickness of about $30\mu$. The salt spray resistance of the coated plate was good, i.e., the coating withstood the salt spray for 2,000 hours. Its throwing power property (test method to be specified later) was also as good as 21 cm.

EXAMPLE 2

2,4-Toluenediisocyanate (174 parts), 232 parts of hydroxyethyl acrylate, 0.5 part of methoxyphenol and 174 parts of methylisobutyl ketone were charged into a reaction vessel having a thermometer, stirrer, reflux condenser, and air-blowing port while air was blown into the vessel, and the reaction was carried out until the NCO value was not more than 1, by elevating the temperature of the vessel up to 100° C. to give a curing agent having a solid content of 70%.

An epoxy resin derivative obtained in Example 1 (91 parts), 38 parts of the above curing agent and 1 part of polypropylene glycol were mixed, and then 14.9 parts of acetic acid (neutralization value: 14) was added. The mixture was warmed up to 60° C., and water-dispersed by adding deionized water gradually, to give an emulsion having a resin solid content of 30%, an average particle diameter of $0.2\mu$ and pH 6.2 and having good stability. The emulsion was formed into a coating composition and the composition was electrodeposited on a plate in the same way as in Example 1. The electrodeposited coating was baked at 150° C. for 20 minutes to give a smooth-surface coating. The salt spray resistance of the coated plate was good, i.e., the coating withstood the salt spray for 2,000 hours. The throwing power property of the coating was as good as 20 cm.

COMPARATIVE EXAMPLE

A resin was synthesized by repeating Example 1 except that 17.8 parts of ethylethanolamine was used in place of 43 parts of the adduct of N,N-dimethylaminopropylacrylamide with monoethanolamine to prepare an emulsion. The resultant product had an average diameter of more than $0.6\mu$ and was separated to two layers.

The above product was emulsified by increasing the amount of acetic acid (neutralization value: 20) to 2.13 parts to exhibit an average diameter of $0.1\mu$. However, the resultant emulsion had low pH of 5.6, and its throwing power property was as small as 17 cm, i.e., was not satisfactory.

THROWING POWER TEST METHOD (PIPE METHOD)

Figures 2, 3:
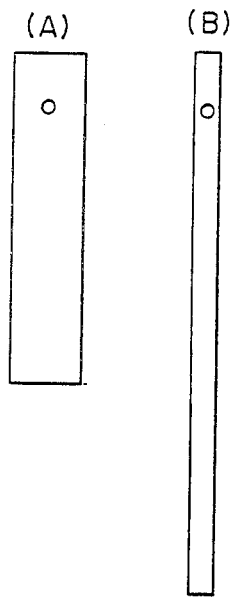

An apparatus used for throwing power property is as schematically shown in FIGS. 1 to 3.

In the Figures, the meanings of symbols are as defined below.

V: Cylindrical stainless steel container ($\phi=100$ mm, $t=1$ mm), without magnetism.
Z: Insulating material
D: Supporter ($\phi=3$, $h=170$ mm)
P: Stainless steel pipe ($\phi=16$ mm, $h=340$ mm, $t=1$ mm), without magnetism.
A: Plate to measure an outer plate coating thickness ($30\times150\times0.8$ mm). See FIG. 2.
B: Plate to measure an inner plate throwing power ($15\times300\times0.4$ mm). See FIg. 3.
T: Mercury thermometer (scales up to 50° C.).
K: Rotor
C: Cooling bath (made of plastic).
M: Magnetic steering motor
L: Liquid level of coating composition Operational Procedures:

(1) A coating composition is charged into a stainless steel cylindrical container V as shown in FIG. 1 to the height L of 27 cm from the bottom, the temperature is adjusted as predetermined (ordinarily, to 30° C.), and the composition is stirred uniformly. (Bath temperature; 30° C.)

(2) An outer plate A, pipe P and inner plate B are inserted into the container V through a supporter D.

(3) An anode and cathode are set to determine that short circuit is not present.

(4) The voltage is increased over 10 minutes from 0 to a predetermined voltage at which the coating on the outer plate is thickened to 20 to $25\mu$. The voltage increase ratio is to be so adjusted as not to exceed 10 A.

(5) 3 minutes after the electricity is turned on, a switch is turned off, and the outer plate, inner plate and pipe are washed with water.

(6) The outer plate and inner plate are baked and dried.

(7) The pipe is cleaned with a solvent in two steps. Especially, the inner surface of the pipe is to be cleaned thoroughly.

(8) The height of a coating on the inner plate is measured. See FIG. 4.

Figure 4:
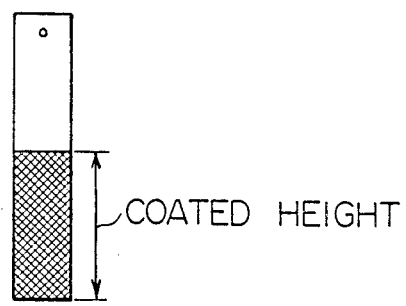

FIG. 1 shows a schematic view of an apparatus for use in testing the throwing power property of an electrodeposition coating composition. FIG. 2 shows a schematic view of a plate to measure a coating thickness on an outer plate for use in said test. FIG. 3 shows a plate to measure the throwing power property on an inner plate. FIG. 4 shows the height of a coating on said inner plate.

The vertical distance between the supporter D and the bottom of the steel container V is 300 mm. The pipes P extend 10 mm above supported D. The bottom of each of pipes P and plate B is positioned 20 mm above the bottom of steel container V. The length of rotor K is 45 mm. In FIG. 2, the diameter of the hole in the upper part of plate A is 4 mm, and the vertical distance between the center of this hole and the top of the plate A is 20 mm. The same dimensions apply to plate B in FIG. 3.

What I claim is:

1. A coating resin composition comprising, as a coating-forming resin binder, an epoxy resin derivative containing a functional group represented by the following formula $$-N\begin{matrix}CH_2-CH-CONH-(CH_2)_n-N\begin{matrix}R_2\\R_3\end{matrix}\\R_4-OH\end{matrix}\quad (I)$$

wherein
$R_1$ represents a hydrogen atom or methyl group; each of $R_2$ and $R_3$ represents a $C_1$-$C_5$ alkyl group independently of the other;
$R_4$ represents a $C_2$-$C_6$ alkylene group in which an ether group (—O—) may be present in the carbon chain; and
n represents an integer from 1 to 6.

2. A composition according to claim 1 wherein the epoxy resin derivative is a reaction product of the secondary amino group of a Michael addition reaction product of monoalkanolamine and dialkylaminoalkyl(meth)acrylamide with 1,2-epoxy group of an epoxy resin.

3. A composition according to claim 2 wherein the monoalkanolamine is represented by the following formula $$HO-R_4-NH_2$$

in which $R_4$ represents a $C_2$-$C_6$ alkylene group in which an ether group (—O—) may be present in the carbon chain.

4. A composition according to claim 3 wherein the monoalkanolamine is selected from 2-aminoethanol, 1-amino-2-propanol, 2-amino-1-propanol, 3-amino-1-propanol, 2-amino-1-butanol, 2-amino-2-methyl-1-propanol, 5-amino-1-pentanol, 4-methyl-4-amino-1-pentanol, 2-hydroxy-2'-(aminoethoxy)ethyl ether and 2-hydroxy-2'-(aminopropoxy)ethyl ether.

5. A composition according to claim 4 wherein the monoalkanolamine is 2-aminoethanol or 3-amino-1-propanol.

6. A composition according to claim 2 wherein the dialkylaminoalkyl(meth)acrylamide is represented by the following formula $$CH_2=C-CONH-(CH_2)_n-N\begin{matrix}R_2\\R_3\end{matrix}$$
$$|\\R_1$$

wherein
$R_1$ represents a hydrogen atom or methyl group;
each of $R_2$ and $R_3$ represents a $C_1$-$C_5$ alkyl group independently of the other; and p1 n represents an integer from 1 to 6.

7. A composition according to claim 6 wherein the dialkylaminoalkyl(meth)acrylamide is selected form N,N-dimethylaminoethyl(meth)acrylamide, N,N-diethylaminoethyl(meth)acrylamide, N,N-dimethylaminopropyl(meth)acrylamide, N,N-diethylaminopropyl(meth)acrylamide, and N,N-dimethylaminobutyl(meth)acrylamide.

8. A composition according to claim 7 wherein the alkylaminoalkyl(meth)acrylamide is N,N-dimethylaminopropylacrylamide.

9. A composition according to claim 2 wherein the Michael addition reaction product is represented by the following formula $$HO-R_4-N-CH_2-CH-CONH-(CH_2)_n-N\begin{matrix}R_2\\R_2\end{matrix}$$
$$\quad\quad |\quad\quad\quad |\\\quad\quad H\quad\quad R_1$$

wherein
$R_1$ represents a hydrogen atom or methyl group;
each of $R_2$ and $R_3$ represents a $C_1$-$C_5$ alkyl group independently of the other;
$R_4$ represents a $C_2$-$C_6$ alkylene group in which an ether group (—O—) may be present in the carbon chain; and
n represents an integer from 1 to 6.

10. A composition according to claim 2 wherein the epoxy resin has a number average molecular weight in the range of from 400 to 4,000.

11. A composition according to claim 2 wherein the epoxy resin is a polyglycidyl ether of polyphenol.

12. A composition according to claim 11 wherein the polyphenol is selected from bis (4-hydroxyphenol)-2,2-propane, bis(4-hydroxyphenyl)-1,1-ethane, bis(4-hydroxyphenyl)-methane, 4,4'-dihydroxydiphenylsulfone, phenol novolak and oresol novolak.

13. A composition according to claim 11 wherein the polyglycidyl ether of polyphenol has a number average molecular weight of at least about 380 and an epoxy equivalent weight in the range of from 190 to 2,000.

14. A composition according to claim 1 wherein the epoxy resin is an epoxide compound represented by the following formula $$CH_2-CH-CH_2-(O-\bigcirc-\underset{CH_3}{\overset{CH_3}{C}}-\bigcirc-O-CH_2-CH-$$
$$\quad\quad\quad\quad\quad\quad\quad\quad\quad\quad\quad\quad\quad\quad\quad\quad\quad\quad OH$$
$$-CH_2)_q-O-\bigcirc-\underset{CH_3}{\overset{CH_3}{C}}-\bigcirc-O-CH_2-CH-CH_2$$

in which q is a number from 0 to 4.

15. A composition according to claim 2 wherein the proportion of the Michael addition reaction product to be reacted with the epoxy resin is 0.05 to 2.0 moles per 1,000 g (solid content) of the epoxy resin.

16. A composition according to claim 1 wherein the epoxy resin derivative further contains an active carbamic acid ester represented by the following formula

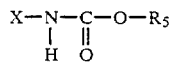

wherein
X represents a tertiary nitrogen atom, oxygen atom or sulfur atom, or an aliphatic $C_1$-$C_6$ hydrocarbon group having one of these atoms on its terminal; and
$R_5$ represents a $C_1$-$C_{12}$ hydrocarbon group which may contain a hydroxyl group or ether bond.

17. A cathodic electrodeposition coating resin composition containing a water dispersion of an epoxy resin derivative of claim 1.

18. Articles coated with a composition of claim 1.

* * * * *